United States Patent [19]

Abbott et al.

[11] Patent Number: 4,826,187
[45] Date of Patent: May 2, 1989

[54] COLLAPSIBLE MONOPOD CART

[76] Inventors: William L. Abbott, 1413 S. Youngfield Ct., Lakewood, Colo. 80228; W. Gordon Peters, 2335 S. Newton, Denver, Colo. 80219

[21] Appl. No.: 112,112

[22] Filed: Oct. 26, 1987

[51] Int. Cl.$^4$ .............................................. B62B 1/12
[52] U.S. Cl. ...................................... 280/35; 248/98; 280/652; 280/47.33
[58] Field of Search ............... 280/35, 652, 47.24, 280/47.26, 639, 47.29, 47.33; 248/97, 98, 165, 178

[56] References Cited

U.S. PATENT DOCUMENTS

| | | | |
|---|---|---|---|
| 2,629,609 | 2/1953 | Wilson | 280/655 |
| 3,677,573 | 7/1972 | Chin | 280/43.1 |
| 3,726,536 | 4/1973 | Arino | 280/47.25 X |
| 3,826,513 | 7/1974 | Wolf | 280/47.13 X |
| 3,863,945 | 2/1975 | Dunstan | 280/79.1 AX |
| 4,166,687 | 9/1979 | Viering | 354/290 |
| 4,268,050 | 5/1981 | Kennedy, Sr. | 280/652 X |
| 4,348,034 | 9/1982 | Welt | 280/35 |
| 4,422,745 | 12/1983 | Hopson | 354/105 |
| 4,542,909 | 9/1985 | Littwin et al. | 280/79.1 A |

Primary Examiner—Charles A. Marmor
Assistant Examiner—Michael Mar
Attorney, Agent, or Firm—Chernoff, Vilhauer, McClung & Stenzel

[57] ABSTRACT

A wheeled, portable, equipment-carrying and camera-mounting cart is provided which is both highly stable and collapsible into a highly compact configuration. The cart comprises a frame having a pair of wheels and camera-mounting monopod offset forwardly of the axis of the wheels, with a selectively extensible and retractable ground-engaging leg assembly which, when extended, forms a regular polygonal stabilizing base in conjunction with the wheels, the monopod being centrally positioned with respect to the polygon. Equipment-supporting surfaces and enclosure members are provided for permitting the user to carry equipment protectively on the cart even when in its collapsed condition.

10 Claims, 2 Drawing Sheets

COLLAPSIBLE MONOPOD CART

BACKGROUND OF THE INVENTION

This invention relates to a wheeled, portable, camera-mounting device which is highly stable and collapsible, and has the carrying capacity for batteries, video tapes, lenses, and other accessory equipment for video and photographic cameras, even when collapsed.

Amateur and professional video producers and photographers need stable support systems to allow them to get desired results, that is, to obtain smooth transitions for video recordings and clear, sharp photographs. Also, since many video or photographic situations require the use of considerable extra equipment, e.g. batteries, tripods, camera bags, cameras, etc., the videophile or photographer needs a convenient means to carry these items. While carrying this equipment and trying to make good recordings, the person creates a situation where increased risk of damage to equipment exists, and therefore protection for the equipment is also important.

Many video or photographic opportunities exist (tourist attractions, amusement parks, plays, sports events, etc.) where space is limited and the presence of bulky carts for carrying equipment would therefore be prohibited, but a stable support for a camera is still desirable. In such situations, any equipment-carrying and camera-supporting cart must be collapsible enough to be placed between seated users' legs and to be moved between seat rows, and should be easy to stow in a car trunk or between car seats for easy transport. When collapsed, the cart should nevertheless be capable of carrying the aforementioned equipment in a protected manner and, when unfolded, should provide a highly stable camera mount. Any such device to be used by professionals or amateurs should also be durable and strong enough for continued use in many different situations.

Although prior devices are well-known which relate to the problems of carrying and transporting camera equipment, these do not compatibly address all of the problems of providing a high degree of collapsible compactness, relieving the user of the burden of carrying the equipment even when the device is collapsed, protecting the equipment from damage, and providing a highly stable, wheel-supported camera platform. The prior devices fall into one of three categories:

1. A device that attaches to a tripod or monopod.
2. A self-contained unit consisting of wheels and tripod or monopod.
3. Three and four-wheeled camera dollies.

Exemplary of devices in the first category are Welt U.S. Pat. No. 4,348,034 and Dunstan U.S. Pat. No. 3,863,945. Examples of devices in the second category are Wolf U.S. Pat. No. 3,826,513; Chin U.S. Pat. No. 3,677,573; and Hopson U.S. Pat. No. 4,422,745. Examples of devices in the third category are Viering U.S. Pat. No. 4,166,687 and Littwin et al U.S. Pat. No. 4,542,909.

SUMMARY OF THE PRESENT INVENTION

The primary object of the present invention is to provide a portable, wheeled, camera-mounting platform which supports the camera in a highly stable manner, yet also provides a highly compact collapsible cart for transporting cameras and equipment and storing accessories in a protective manner even when collapsed.

The foregoing object is accomplished by mounting an upright camera-supporting monopod in a significantly offset relationship horizontally relative to a pair of ground-engaging members, preferably cart wheels, so that when the device is unfolded the monopod is located approximately at the center of an equilateral triangle or other regular polygon defined by the ground-engaging points of the pair of members and an extensible leg or legs. The leg or legs are preferably adjustable to allow leveling of the camera base with respect to any slope upon which the user can comfortably stand.

Some of the equipment-carrying volume of the device is maintained in a protected fixed enclosure positioned between the pair of ground-engaging members and the location of the monopod while the unit is in a collapsed condition. A second equipment-carrying enclosure unfolds in response to the extension of the aforementioned leg or legs to provide the stable camera-mounting base. Both the fixed and foldable equipment-carrying enclosures of the device provide space and support for a large assortment of accessory equipment. Cloth bags hang on upper members of the enclosures to contain and protect the equipment, and are removable for cleaning.

Upon retraction of the extensible leg or legs, further ground-engaging members are provided to support the cart in an upright position in its collapsed condition, the extensible leg being pivoted inwardly so as not to extend beyond the folded cart dimensions.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
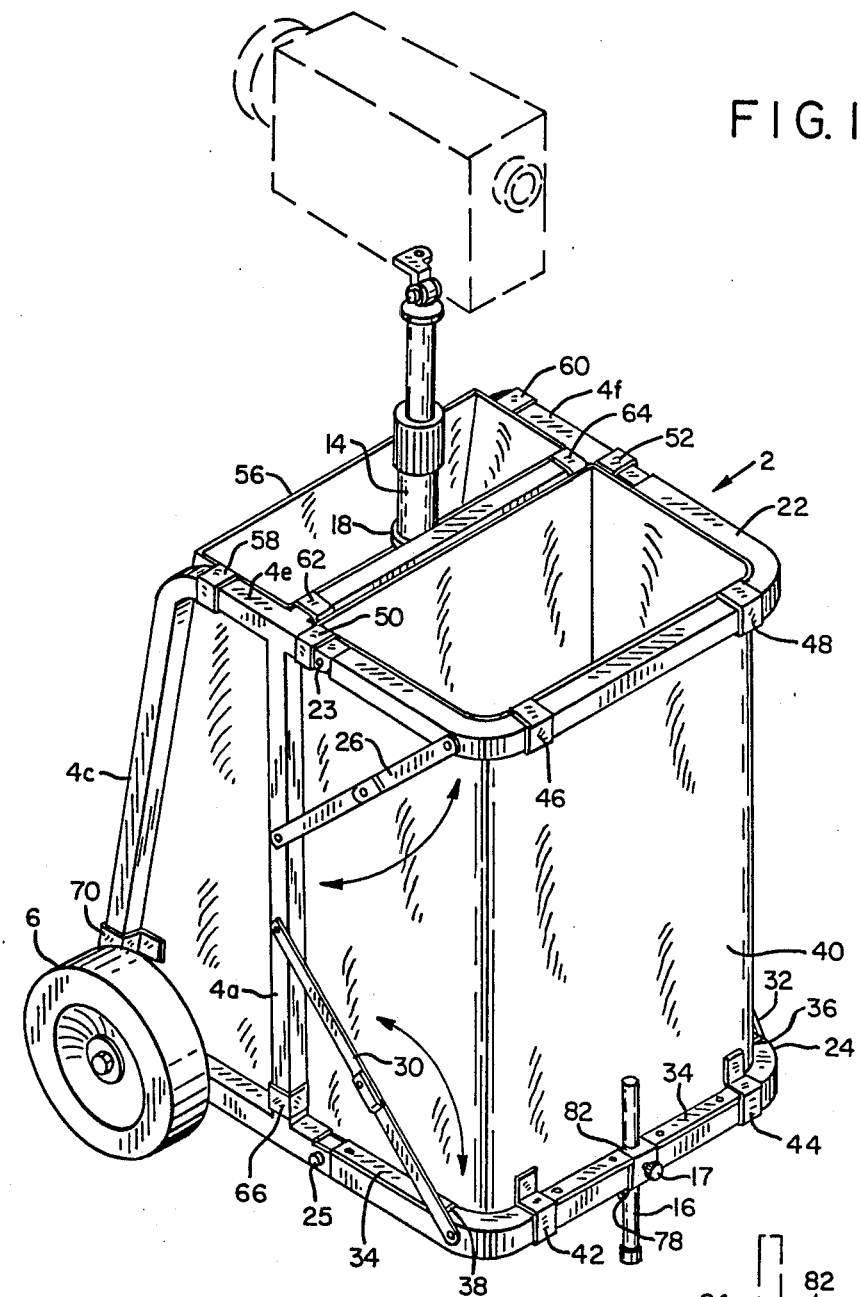
FIG. 1 is a perspective view of an exemplary embodiment of the present invention in its unfolded condition providing a stable camera-mounting base.
Figure 3:
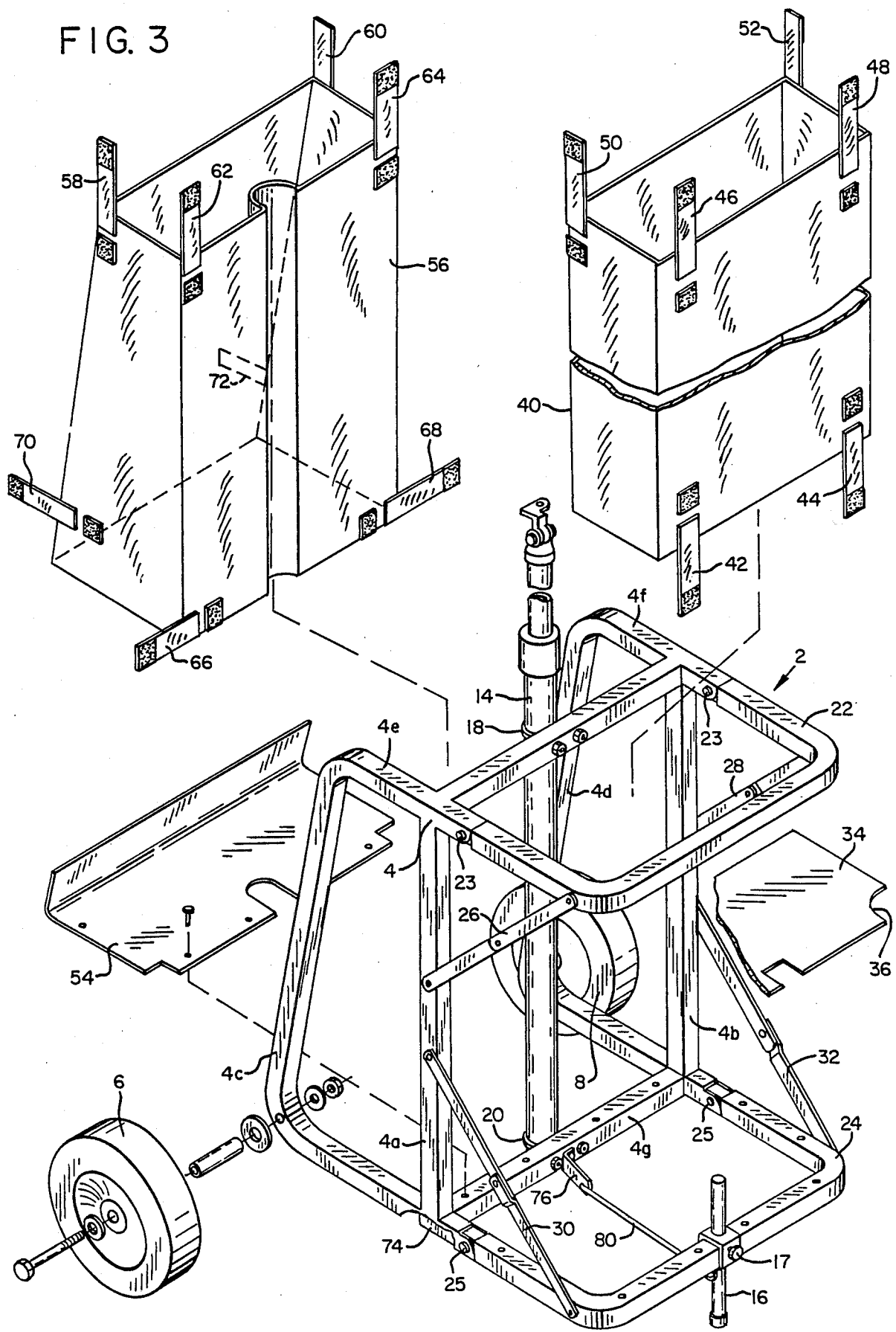
FIG. 3 is an exploded perspective view of the embodiment of FIG. 1.

FIGS. 1 and 3 depict a portable, foldable cart, indicated generally as 2, in its unfolded condition. The main frame 4 is a rigid metal structure for supporting the weight of the camera and gear, and mounts a pair of cart wheels 6 and 8 having a common axis. A telescopically extensible and retractable camera-mounting monopod 14, which also serves as a cart handle, is mounted by U-clamps 18 and 20 to the frame 4 so as to be positioned substantially at the center of an equilateral triangle defined by the points of contact of the wheels 6 and 8 with the ground and the point of contact of a selectively extensible leg 16 with the ground. Alternatively, two legs 16 could be provided to form a square base with the upright axis of the monopod at the center thereof, although a triangular base is preferred. The leg 16 is vertically adjustable for leveling purposes by means of a lockable thumbscrew 17.

An upper collapsible arm 22 and lower collapsible arm 24 are hinged to pivot about screws 23 and 25, respectively, between open and closed positions. Locking support brackets 26, 28, 30 and 32, when extended, lock the collapsible arms in their operative unfolded positions. A front equipment-supporting surface 34, attached to the lower collapsible arm 24, has cutouts 36 and 38 at the front corners which permit a front equipment-holding flexible bag 40 to be secured detachably to the lower collapsible arm 24 using sewn-in Velcro fasteners 42 and 44, while the bag is also suspended detachably from the upper collapsible arm 22 using sewn-in Velcro fasteners 46, 48, 50 and 52.

A rear equipment support surface 54 is attached fixedly to the main frame 4 and may serve as a mount for the battery or batteries, or other equipment, as desired. It will be noted that the rear equipment support surface 54 provides support at all times, independently of the folded or unfolded conditions of collapsible arms 22 and 24. A rear equipment-holding flexible bag 56 employs Velcro fasteners 58, 60, 62, 64, 66, 68, 70 and 72 which similarly detachably hold the bag in place on the frame 4 by attachment to vertical frame members 4a, 4b, 4c and 4d and suspension from top frame members 4e and 4f. These frame members form a fixed, rigid protective enclosure for equipment, which enclosure is effectively expanded in size when arms 22 and 24 are unfolded.

Figure 2:
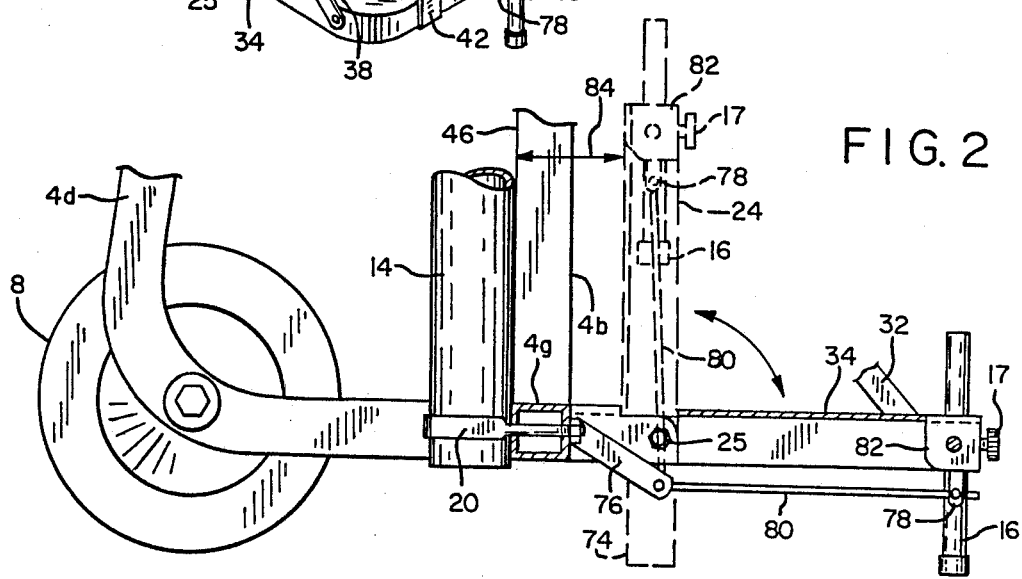
FIG. 2 is a sectional view of the extensible leg structure in its unfolded condition, with its folded condition being shown in phantom.

FIG. 2 shows the mechanism for articulating the arm 24 and extensible leg 16. A bracket 76 is fixed to a lower transverse frame member 4g and is connected to a swivel arm 78 by means of a connecting rod 80 pivoted at each end. Arm 78 is mounted to a swivel block 82 which is pivotally attached to the arm 24. As the arm 24 is raised for folding purposes, the leg 16 pivots inwardly remaining in an orientation parallel to the monopod 14 as shown in phantom so that it does not protrude forwardly when the device is folded. FIG. 2 also shows the downward extension of the ends 74 of the lower collapsing arm 24 for purposes of supporting the cart in an upright position when in its collapsed condition.

The forward protrusion of the pivot screws 23 and 25 relative to the forward extremity of the fixed enclosure (defined by the vertical frame members 4a and 4b), and relative to the forward extremity of the rear bag 56, provides a clearance 84 (FIG. 2) into which the front bag 40 may collapse when the arms 22 and 24 are folded.

In the preferred embodiment, the frame 4 and upper and lower arms 22 and 24 are constructed from a strong dense material such as tubular steel. The bags 40 and 56 are constructed of a tough, durable and washable fabric such as Nylon or denim. Both contribute to the protection of the equipment.

Although the preferred embodiment of the invention features the wheels 6 and 8 in the positions as shown in the figures, it is within the scope of the invention alternatively to substitute fixed ground-engaging members at such positions and to mount the wheels elsewhere, such as at the ends of the lower transverse frame member 4g. In such case, when the leg 16 is extended into contact with the ground, the wheels would be lifted from the ground establishing the same polygonal stabilizing base as in the preferred embodiment.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A selectively collapsible and openable and camera-mounting cart capable of operably mounting a camera while in either a collapsed condition or an opened condition, comprising:
   (a) a frame;
   (b) a horizontally spaced pair of ground-engaging members mounted on said frame and aligned with each other along a horizontally-extending axis;
   (c) camera-mounting means attached to said frame for mounting a camera at a position above said pair of ground-engaging members, said camera-mounting means being selectively extensible and retractable along an upright axis offset by a first horizontal distance in a direction perpendicular to said horizontally-extending axis;
   (d) first selectively extensible and retractable leg means movably mounted on said frame for engaging the ground, when extended and with said cart in said opened condition, at a point or points offset in said direction from said horizontally-extending axis by a second horizontal distance greater than said first horizontal distance so that said point or points where said leg means engages the ground, in combination with the points where said pair of ground-engaging members engage the ground, define a horizontal, substantially regular, polygon having said upright axis of said camera-mounting means substantially centrally located with respect to said polygon; and
   (e) second selectively extensible and retractable leg means movably mounted on said frame for engaging the ground, when extended and with said cart in said collapsed condition, at a point or points offset in said direction from said horizontally-extending axis by a third horizontal distance greater than said first horizontal distance but less than said second horizontal distance for supporting said camera-mounting means in an upright position wherein a one of said first said second selectively extensible and retractable leg means is automatically retracted from its ground-engaging condition when the other of said first and second selectively extensible leg means is extended into its ground engaging condition, said camera-mounting means being capable of being maintained in the same, substantially upright position when either of said first and said second selectively extensible and retractable leg means is in its ground engaging condition.

2. The apparatus of claim 1, including means for vertically adjusting the elevation of said first leg means relative to said frame while said leg means is extended.

3. The apparatus of claim 1, including a generally horizontal first equipment-supporting member mounted on said frame in a position to one side of said upright axis which is substantially coextensive with said horizontally-extending axis and with said first horizontal distance, and which is independent of the extension or retraction of said first leg means.

4. The apparatus of claim 3, including a second equipment-supporting member movably mounted on said frame for extending in unison with said first leg means into a generally horizontal position on a side of said upright axis which is opposite to that where said first equipment-supporting surface member is positioned.

5. The apparatus of claim 1 wherein said frame includes a pair of horizontally spaced, elongate members located above said horizontally-extending axis, each elongate member extending longitudinally to one side of said upright axis substantially coextensively with said first horizontal distance, for supporting equipment by suspension therefrom.

6. The apparatus of claim 5, including an equipment-carrying bag detachably suspended from said elongate members.

7. The apparatus of claim 5, including a pair of selectively extensible and retractable extensions of said elongate members movably mounted on said frame for extension to a position on a side of said upright axis which is opposite to that where said elongate members are located.

8. The apparatus of claim 7, further including a pair of equipment-carrying bags, one detachably suspended from said elongate members and the other detachably suspended from said selectively extensible and retractable extensions.

9. The apparatus of claim 1 wherein, said first leg means includes means for pivoting said first leg means into a position substantially parallel with said upright axis in response to the retraction of said first leg means.

10. The apparatus of claim 1 wherein said horizontally spaced pair of ground-engaging members comprise a pair of wheels rotatably mounted on said frame.

* * * * *

UNITED STATES PATENT AND TRADEMARK OFFICE
CERTIFICATE OF CORRECTION

PATENT NO. : 4,826,187

DATED : May 2, 1989

INVENTOR(S) : William L. Abbott et al.

It is certified that error appears in the above-identified patent and that said Letters Patent is hereby corrected as shown below:

Col. 4, line 68    delete "surface"

Signed and Sealed this

Twenty-third Day of July, 1991

Attest:

HARRY F. MANBECK, JR.

*Attesting Officer*     *Commissioner of Patents and Trademarks*